Feb. 18, 1964         C. A. LARSEN         3,121,370
AUTOMATIC ELECTRO-HYDRAULIC TRACER
Filed June 21, 1961                       5 Sheets-Sheet 1

Inventor: Charles A. Larsen
By: George E. Szekely
    Agent-

Feb. 18, 1964   C. A. LARSEN   3,121,370
AUTOMATIC ELECTRO-HYDRAULIC TRACER
Filed June 21, 1961   5 Sheets-Sheet 3

Inventor: Charles A. Larsen
By: George E. Szekely
Agent

Feb. 18, 1964   C. A. LARSEN   3,121,370
AUTOMATIC ELECTRO-HYDRAULIC TRACER
Filed June 21, 1961   5 Sheets-Sheet 5

Inventor: Charles A. Larsen
By: George E. Bekely
Agent.

United States Patent Office 3,121,370
Patented Feb. 18, 1964

3,121,370
AUTOMATIC ELECTRO-HYDRAULIC TRACER
Charles A. Larsen, Racine, Wis., assignor to George Gorton Machine Co., Racine, Wis., a corporation of Wisconsin
Filed June 21, 1961, Ser. No. 118,544
7 Claims. (Cl. 90—13.5)

My invention relates to an automatic tracer of the type which senses a minute deviation of a stylus from a path defined by a pattern, emitting an electrical error signal, which, when transmitted through a control and servo system, actuates the hydraulic feeds of machine tool components in such manner as will instantaneously restore the stylus to the prescribed path, thereby causing the stylus to trace the pattern contour. A cutter associated in fixed relation to the stylus thus follows a corresponding path relative to a workpiece associated in fixed relation to the pattern, reproducing the pattern on the workpiece. Such tracer apparatus is particularly suitable to milling machine operation, but is not restricted thereto, being adaptable to other machine tools in which equivalent relative motions of cutter and workpiece are producible.

My tracer apparatus is essentially an attachment or auxiliary which may be fitted to an otherwise substantially standard machine tool, of requisite basic accuracy, with at most only secondary modifications, so that the machine may be efficiently usable for its normal functions in addition to its operability under tracer control. That is, I contemplate the reproduction of intricate irregular or curvilinear contours by tracer control of the usual rectilinear feed motions of such a machine tool as a vertical mill.

In general, machines with hydraulically powered feeds have been found the most adaptable to the sensitively responsive feed variability necessary to satisfactory tracer-controlled operation. Electric motor feeds are usually less dependably controllable, because of difficulties in economically and effectively compensating the mechanical and electrical inertial effects. Compensation with complex controls, brakes, and clutches is not only costly, but generally introduce hazards of inaccuracy, breakdown and wear at least as detrimental as the deficiencies they are intended to alleviate.

Hydraulic tracer heads have been developed for use with hydraulically powered feeds. These heads usually comprise a multiple servo-valve responsive to stylus deflections, affording relatively direct control of the hydraulic feeds. However, such hydraulic heads are not readily susceptible of convenient on-the-job adaptability to a variety of work, are rather bulky, and subject to the vagaries of wear, leakage, pressure fluctuation and the like.

I have found that a combination of electrical sensing and control with hydraulic feed actuation offers the best possibilities for accurate, reliable and economical duplication of a wide variety of parts with a given basic machine.

Electro-hydraulic tracers have been devised heretofore for such purposes as I intend, by my implementation of the broad concept differs from the prior art devices in a number of important respects, reflected most particularly in the high degree of accuracy, reliability, economy and simplicity achieved with my novel tracer apparatus. It has been proposed to excite an error signal by means of switches or contactors responsive to stylus deviations. However, to establish adequate discrimination with make and break contact devices requires mechanical multiplication of the deviation, introducing friction, lost motion and other sources of inaccuracy which have not been reliably or economically overcome. Piezoelectric transducers have been suggested, but their successful adaptation involves substantial pressure, which must be developed either directly between stylus and pattern, or through linkage.

The latter is objectionable for the same reasons as above noted with relation to multiplier mechanisms. Heavy stylus/pattern pressure causes excessive stylus and/or pattern wear. Necessity for hard patterns restricts the choice of pattern materials, increases pattern costs and results in aggravating stylus wear, with consequent inconvenience and cost of frequent stylus replacement. The use of a revoluble stylus involves costly and delicate high precision bearings, with a hazard of error from stylus oscillation or vibration.

Various proposals have been made for means of exciting error signals without mechanical contact of stylus and pattern, for example by electrical arc or photo-electric beam. These expedients are both objectionable in that they narrowly restrict the choice of pattern materials and forms to those capable of appropriately selective electric or photronic responsiveness. The arc arrangement is further subject to pattern and stylus damage by the arc. Photoelectric sensors are virtually limited by practical considerations to two-dimensional work from drawings or plane templets requiring highly specialized treatment.

The sensor or pick-up of my tracer is a compact cartridge consisting essentially of a deflectable stylus and coaxial linear differential transformer. While various electro-magnetic transducers have been heretofore employed in tracer heads, their prior application has been invariably associated with mechanically and electrically complex arrangements for translation, discrimination, resolution and transmission, as a means presumptively to achieve accurate and sensitive actuation of the feed devices. Multifarious manipulation of the error signal and controls therefor involves a complexity and cumbersomeness of apparatus which is a source of error and unreliability at least as troublesome as those intended to be compensated. Furthermore, intricate electronic manipulation compels resort to space-discharge devices, such as vacuum-tubes or thyratrons, which are difficult to stabilize at preselected conditions of response. Also, due to their dependence on heater control for correct emissivity, space-discharge devices are particularly susceptible to adverse thermal effects. The foregoing and associated erraticisms most commonly exhibit themselves in "hunting" and resulting exaggerated step cutting, a problem which prior designers have attempted to solve by superimposing anti-hunt controls.

In sum, prior electro-hydraulic tracers have been found deficient in accuracy, reliability and economy. These deficiencies I have overcome with my novel combination of mechanical, electrical and hydraulic components, greatly simplifying signal and controls manipulation. I have thereby successfully dispensed with space-discharge devices, requiring only the use of transistors, gaining significantly improved stability, longevity and compactness.

The primary object of my invention is to provide an electro-hydraulic automatic tracer which will facilitate economical reproduction of close-tolerance, finely finished parts from inexpensive masters.

A further object of my invention is to provide a tracer which is readily set-up and operated without exceptionally close or unusually skilled supervision.

A still further object is a tracer which is low in initial and upkeep cost, and in which hazards of wear, breakdown and accidental damage are minimized.

Another object is a tracer which is compact and economical of working space in, on and around the machine to which it is applied.

Still another object is to devise a tracer whose functioning and control are substantially unaffected by ambient electrical and thermal disturbances usually encountered in locations where the apparatus may be required to operate. These and further objectives and advantages of my tracer apparatus will be readily apparent from the following description, with reference to the appended drawings, in which:

FIG. 9 is a schematic diagram of the linearly variable differential transformer winding.

In the drawings, similar reference characters are used to indicate corresponding parts throughout the several views.

General Arrangement

Figure 1:
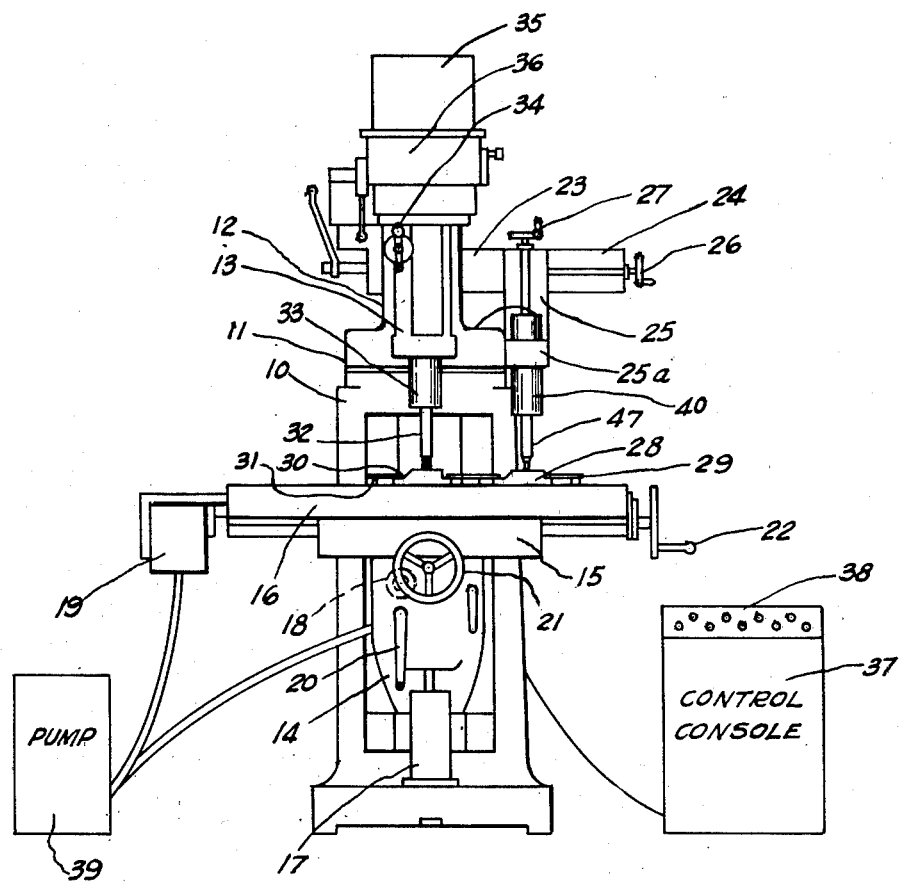
FIG. 1 is an outline front elevation of a machine tool, incorporating my tracer apparatus.

FIG. 1 illustrates a typical application of my tracer apparatus, in this case to a vertical milling machine. It will be understood that the depiction of the particular machine tool is by way of illustration only, as my invention is not limited thereto, being applicable generally to machine tools providing at least two transverse rectilinear feeds of a workpiece relative to a cutter.

In its general organization the basic machine may be of conventional design, having a column 10, above which are mounted turret 11, ram 12, and spindle housing 13. Knee 14, sliding vertically on the front of column 10, supports saddle 15, which slides crosswise of knee 14, and in turn supports table slide 16, for longitudinal movement relative to knee 14. For the purposes of tracing 3-dimensional work automatically, vertical feed is provided by double-acting hydraulic cylinder 17 driving knee 14, cross feed by a reversible hydraulic-motor driven screw feed 18 in knee 14, driving saddle 15, and longitudinal feed by a reversible hydraulic-motor driven screw feed for the table, the motor housing of which is indicated at 19. The details of these drives, except as elsewhere herein indicated, are not material to understanding my invention, being otherwise of construction well known to the art. The power feeds may be manually controlled for set-up or checking purposes, as described hereafter. Although the indicated powered feeds are normally employed in trace-controlled operation of the machine, usual hand feeds for knee, saddle and table may be provided by cranks 20, 21 and 22. Thus, the respective components may be hand fed for preliminary set-up, for use of the machine under manual feed control in supplementary operations, or for use as a general-purpose milling machine.

A tracer head support 23, extending parallel to the feed axis of table 16, is rigidly mounted on spindle housing 13. Support 23 is equipped with slides 24 and 25, manipulable respectively by feed cranks 26 and 27, slide 24 being mounted on support 23 for longitudinal movement and slide 25 or slide 24 for vertical movement. Slide 25 carries the tracer head bracket 25a with stylus barrel 40 mounted therein, the assembly being so positioned as to allow stylus 47 to scan pattern 28, held to table 16 by clamps 29, as table 16 is fed in its several directions. A workpiece 30, to be contoured in duplication of pattern 28, is held to table 16 by clamps 31, in a position to be scanned by cutter 32 as stylus 47 scans pattern 28. Cutter 32 is clamped in spindle 33, the quill of which may be positioned vertically by turning crank 34. It will now be seen that with the pattern 28 and the workpiece 30 aligned on table 16, stylus 47 and cutter 32 may be positioned in such aspect to the pattern 28 and workpiece 30 as is most favorable in effecting the duplicating traverse for a particular job, by suitable adjustments of ram 12, spindle 33, slide 24 and slide 25; whereafter the latter components are locked in adjusted position by clamping screws (not shown). The stylus 47 and cutter 32 will then be held on parallel axes with their tips in exactly corresponding positions over pattern 28 and workpiece 30 respectively.

Motor 35 drives spindle 33 through a speed changer 36, whereby cutter speed can be selected as best suited to the material and desired finish of a particular workpiece. Electrical control apparatus may be housed in a console 37 with control knobs, pushbuttons, meter, signal lights and other appurtenances to be observed or manipulated by an operator, conveniently grouped on top panel 38. Cabinet 39 houses a suitable motor-driven pump, hydraulic fluid reservoir and other appurtenances required to supply fluid for the hydraulic feed apparatus. The electrical and hydraulic systems are described hereinafter.

Tracer Head

Figure 2:
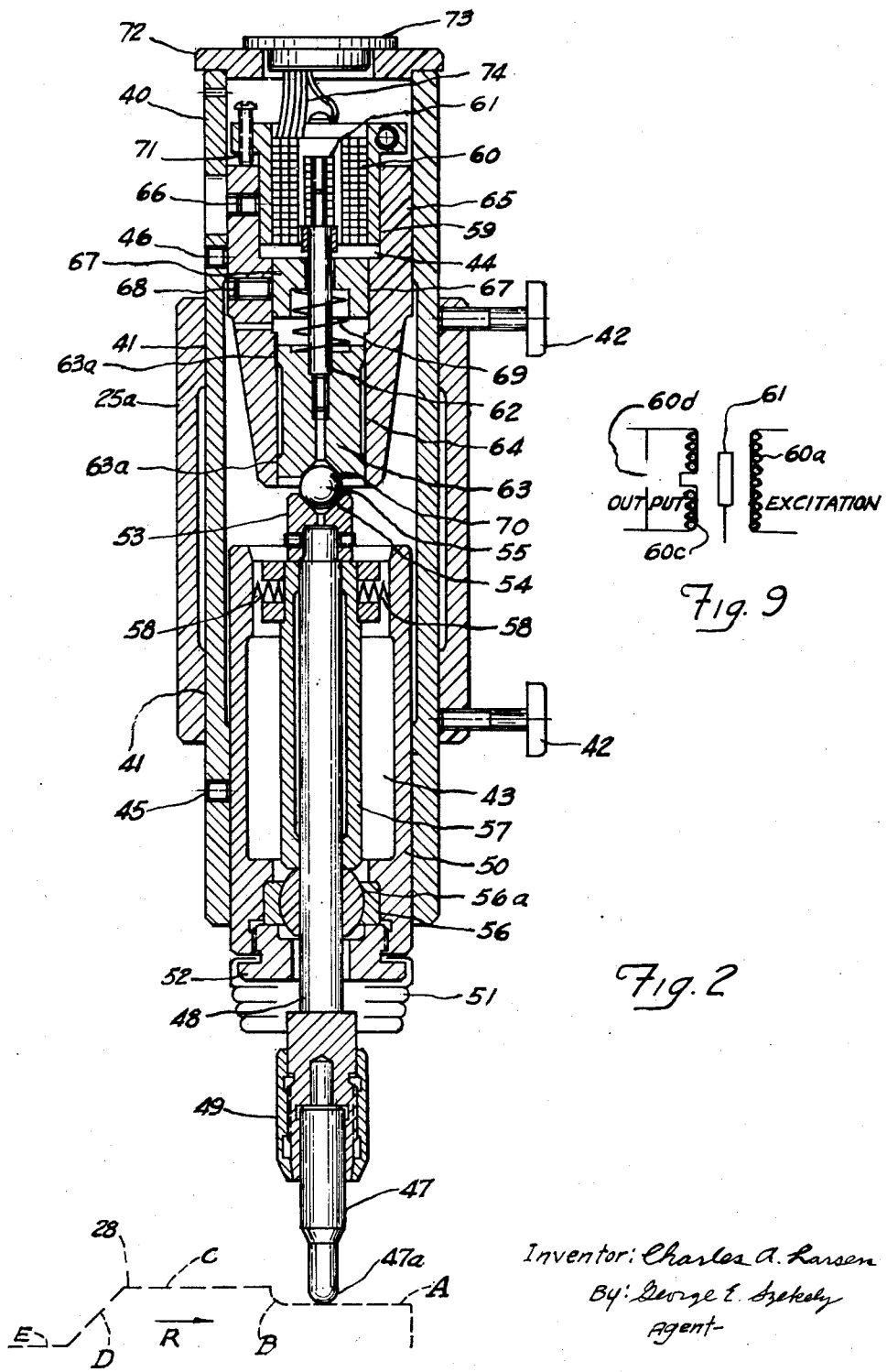
FIG. 2 is a vertical section through the tracer head assembly.

Referring now to FIG. 2, bracket 25a holds barrel 40 precisely on a fixed axis by means of closely fitted concentric spaced lands 41, the barrel 40 being held against movement relative to bracket 25a by clamping screws 42. Inside barrel 40 and concentric therewith are two coaxially aligned cartridge assemblies, a stylus cartridge 43 and a transformer cartridge 44, fixed by set screws 45 and 46 respectively. The assembly of barrel 40 with cartridges 43 and 44 may be collectively designated as the "tracer head." Depending from cartridge 43 is the stylus 47 clamped to a stem 48 by collet 49. Stem 48 is flexibly sealed to cartridge sleeve 50 by a bellows 51, fastened to sleeve 50 by a threaded bushing 52. At its upper end stem 48 is provided with a cap 53, which has a 45° right conical seat 54 to receive ball 55. Intermediate between stylus tip 47a and ball 55 is a spherical swivel bearing 56, whose inner sleeve 56a has a close sliding fit on stem 48. The geometry of the arrangement is such that, in the absence of external force on the stylus 47, the latter lies with its axis exactly coinciding with the axis of barrel 40 and the tip 47a at the same distance below the center of swivel bearing 56 as the center of ball 55 is above the swivel center, downward movement of the stem being arrested by cap 53 resting on spacer 57, which in turn rests on sleeve 56a. Radial equalizing springs acting around the upper end of spacer 57 counteract any residual deflective forces of friction, bellows or the like tending to prevent restoration of the stylus to its coaxial position, subsequent to an imposed deflection.

The upper cartridge 44 includes a tubular case 59 containing a wound tubular magnetic field 60 and linearly displaceable coaxial core 61, comprising a linear differential transformer, the characteristic of which is that the magnitude of field winding output varies from a null or minimal value in proportion to the extent of linear displacement of the core relative to the field from a null or centered position. The transformer output constitutes the error signal, to be produced and manipulated for control of the machine feeds in a manner hereinafter described.

The arrangement is electrically diagrammed in FIG. 9, wherein 60a represents the excitation winding connected to the power supply, 60b and 60c are the upper and lower differential sections of the output winding, the total output of which is passed as an error signal, and the algebraic differential of which appears at 60d, for a purpose later to be shown. Core 61 is affixed to a shaft 62, the lower end of which carries a plunger 63 sliding in lower bore 64 of housing 65, in the upper end of which transformer case 59 is fixed by setscrew 66. The plunger 63 has spaced lands 63a guiding the plunger 63 and attached core 61 truly coaxial with the field 60. Thimble 67 fixed in housing 65 by set screw 68 retains a compression spring 69 bearing on top of plunger 63. At its lower end plunger 63 is provided with a 45° right conical seat 70 borne against ball 55 by spring 69, ball 55 being thus held to opposed seat 54 at the top of stem 48.

It will be seen that if stylus tip 47a is deflected, in any direction from its free position coaxial with barrel 40, swiveling of stem 48 on bearing 56 will deflect seat 54 a linear distance equal to the tip deflection. Since ball 55, resting on seat 54, is restrained by seat 70 against movement of the axis of plunger 63, the ball must rise on the 45° slope 54, forcing plunger 63 and core 61 upward a distance equal to the linear displacement of the tip 47a from center position. If the tip 47a is raised axially the core 61 moves upward the same amount by direct linear transmission through ball 55. Should both direct upward motion and lateral deflection occur simultaneously the core 61 moves upward a distance equal to the arithmetic sum of the linear tip displacements. In any event, the linear movement of core 61 will be equal to the net linear displacement of tip 47a from its reference position, and the change in magnitude of signal transmitted from the transformer will be proportionate thereto. The spring thrust against plunger 63 is just sufficient to maintain a firm non-chattering contact between ball 55 and the seats 54 and 70. I find that about 8–12 ozs. is adequate. The stylus tip need not then be pressed hard against the pattern, permitting use of relatively soft pattern materials without danger of excessive wear or scoring.

Screw 71 is used for adjusting the axial position of field 60 relative to core 61, to establish zero or minimum signal with the stylus at its null or reference position. Cap 72 seals the top of barrel 40 and serves as a mount for an electrical cable connector 73 through which the transformer leads 74 are brought.

Because the entire mechanism is substantially direct acting, with few actuating motions, there is virtually no inaccuracy from lost motion, wear or maladjustment. The mechanical parts are economicaly producible with a high degree of retainable precision, insuring accurate signal discrimination for extremely small stylus displacements.

*In-Cycle Tracer Control System*

Figure 3:
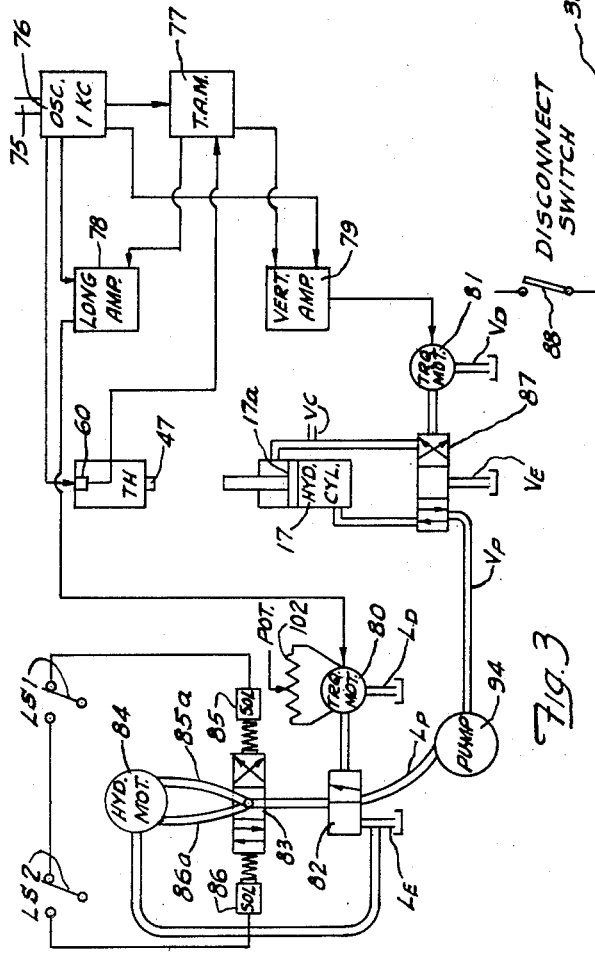
FIG. 3 is a general schematic diagram of the tracer control system.

The general organization of the in-cycle tracer control system is shown diagrammatically in FIG. 3. The system is of the type referred to in the art as a 180° tracer. That is, the direction of feed along a principal coordinate of the traverse is not under control of the stylus during the traverse, so that the maximum in-cycle sweep along any circular arc is 180°. For maximum versatility with a vertical mill my control arrangement provides tracer control of the vertical and horizontal feeds. 3-dimension automation being provided by limit-switch sequence actuation of saddle cross-feed and horizontal feed reversal after a traverse, for traverse in the opposite direction along an adjacent path. FIG. 3 shows only the system correlated to the error signal from the tracer head.

Power may be supplied by any usual single-phase A.C. source, such as the 115-volt, 60-cycle line 75. However, since a 60-cycle pulse is too coarse for the sensitive, instantaneous responses required for my tracer controls, I provide a high-frequency oscillator 76, which is preferably tuned to a 1 kc. output wave. This output is fed, at appropriate voltages, to the tracer head transformer 60, a trans-axis module 77, a longitudinal amplifier 78 and vertical amplifier 79. Any error signal picked up at the transformer 60 is fed to the trans-axis module 77, where it is impressed on the longitudinal and vertical feed control circuits, rectified and relayed with amplification at 78 and 79 to the respective servo torque motors 80 and 81.

Motor 80 operates a servo valve 82, which controls flow to the 4-way valve 83 feeding hydraulic motor 84. Motor 84 is of a reversible vane-type whose direction of rotation is determined by the direction of flow from the valve 83 through lines 85a and 86a. Motor speed varies with the flow volume. Thus the motor 84, located at 19, FIG. 1, feeds the table 16 in either direction at various speeds, according to the positioning of valve 82 and 83.

Torque motor 81 operates a 4-way servo valve 87, feeding the chambers of double-acting hydraulic cylinder 17, which raises and lowers the knee 14.

*Control Functions*

Figure 4:
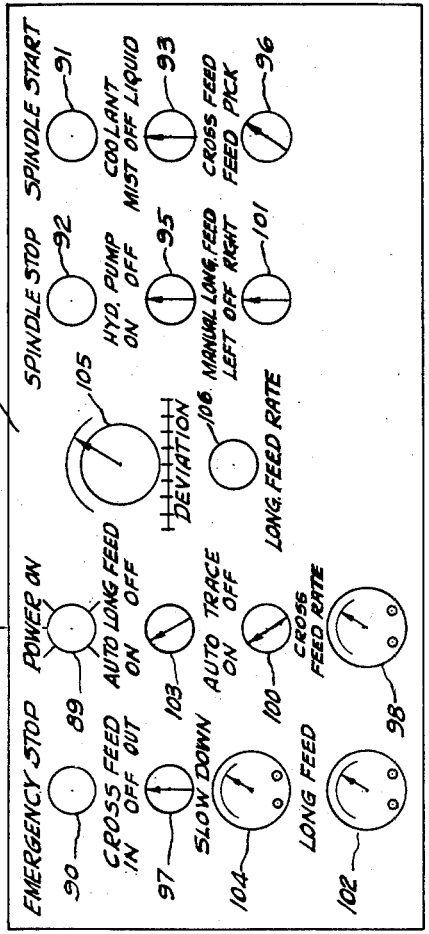
FIG. 4 is a schematic plan of the control panel for the electrical console.

FIG. 4 shows the arrangement of the console control panel 38, FIG. 1. As a convenience, controls for power operation of the machine at the direction of the operator are grouped with those specifically involved in trace-controlled operation. Power for all electrics is supplied from a main line through disconnect switch 88, whose closing is indicated by lighting of pilot 89. Emergency stop button 90, opening a normally closed switch, stops spindle motor and hydraulic pump motor, without disabling or disturbing the rest of the machine or controls, except that knee 14 will fall to its lowest position on cessation of hydraulic supply. Start and Stop buttons 91 and 92 are furnished for individual operation of the spindle motor. Cutter coolant supply is under control of 3-position switch 93, with off, mist and liquid selection provided. Hydraulic pump 94 (FIG. 3), in cabinet 39 (FIG. 1), is turned on or off by switch 95. Cross feed for the saddle 15 (FIG. 1) is controlled by means of selector switches 96, 97 and potentiometer 98. With switch 96, in "pick" position, the feed is incremental at the end of each stylus traverse, as table feed reverses upon actuation of a limit switch, the cross-feed direction being that selected by switch 97. If switch 96 is at feed position, the saddle feeds in or out under power in the direction selected by switch 97, at a speed established by potentiometer 98.

The direction of manually controlled powered table feed is selected at switch 101, the rate being established by potentiometer 102. Thus, the machine can be power-operated under manual control, with the trace selector 100 in off position. With selector 100 at "on," selector 96 at "pick" and selector 103 at "on," the machine is readied for tracer control in response to deflections of stylus 47. The established conditions are such that at null stylus position the table 16 (FIG. 1) feeds at the rate established on potentiometer 102, while knee 14 is stationary at the level of selected starting position with stylus 47 contacting master 28. The slow down potentiometer 104 is used to reduce the long feed rate established by potentiometer 102, in such conditions as obtain when the stylus approaches an exceptionally abrupt contour change at a normally high feed rate suitable to the general course of the trace. The adjustment range of 104 is such as will permit bringing the long feed to a complete stop without deenergizing the feed controls.

A galvanometer 105 is normally responsive to the magnitude of the error signal emitted by the transformer 60 (FIG. 2). Meter 105 is calibrated on one scale to read plus or minus deviation of the stylus from selected null or reference positions, in thousandths of an inch. It will be understood from FIG. 2 that such deviation is as measured by the vertical movement of core 61, hence is non-directional with respect to the rotary position of stylus 47 about its normal axis. The direct reading of stylus deviation is useful in set-up, selecting stylus size and for detection of unusual deviations during the trace which may indicate malfunction or call for slow down by manipulating potentiometer 104. Meter 105 may be switched to respond with the long feed rate as established, by depressing button 106, in which case a second scale reads feed rate in inches/minute.

*Electrical Control Circuitry*

Figure 5:
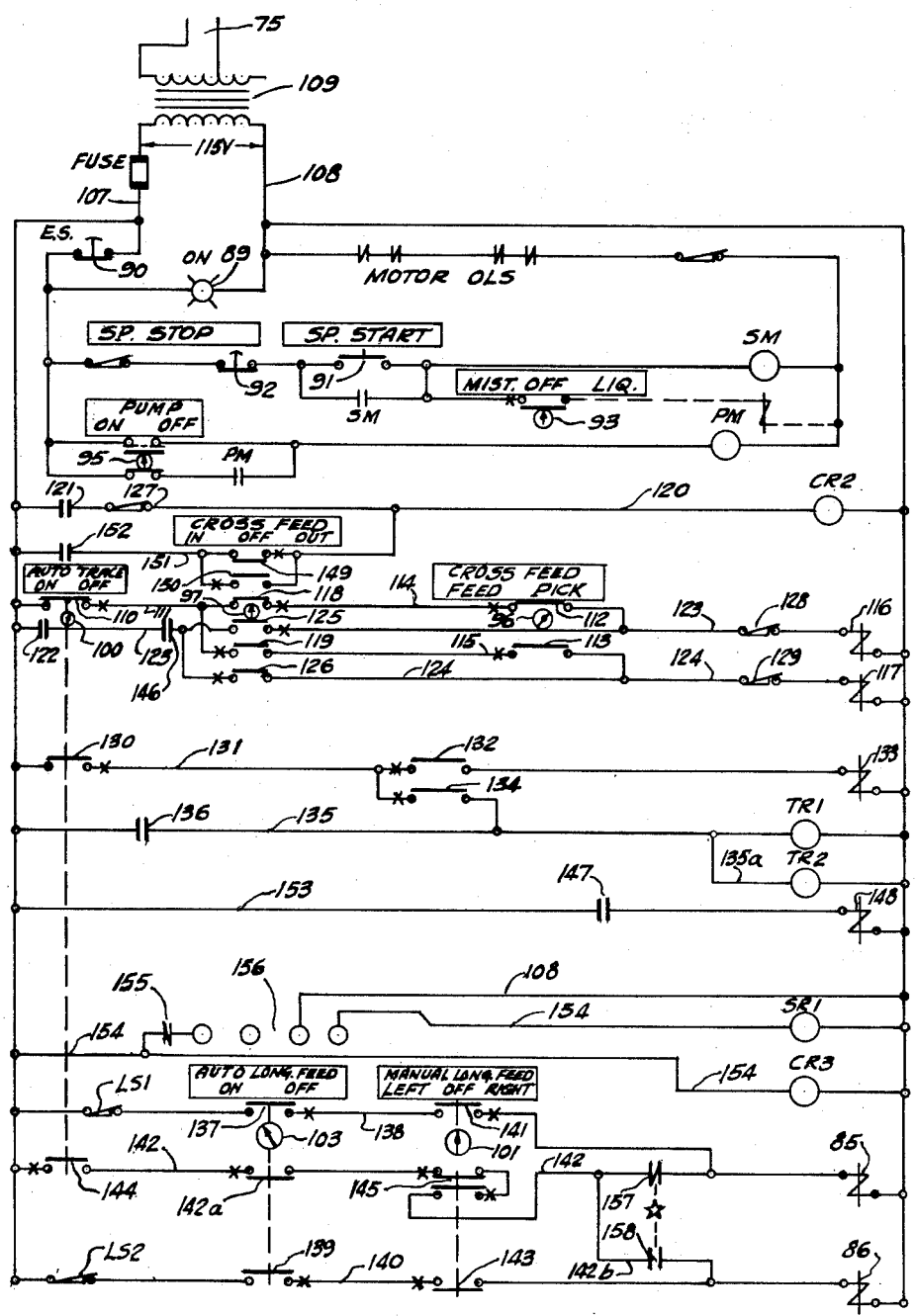
FIG. 5 is a schematic diagram of the electrical console components and wiring.

FIG. 5 shows the relationship of the panel controls of FIG. 4 to the control circuits, principally housed in console 37, FIG. 1. The 115 v. single phase leads are indicated at 107 and 108. Since a polyphase supply will normally be required for the spindle and pump motors, current is brought from two wires of the polyphase main line through transformer 109. An inner circuit fed through normally closed emergency stop switch 90 serves the motor control switches 91, 92, 95, coolant selector switch 93, and "power on" light 89, the latter being across the line and lighted except on emergency stop or full disconnect. Power is available through leads 107 and 108 to other controls, even on emergency stop, so other elements are held under control and work can be resumed after clearing emergency, without reset of the other controls.

With trace selector switch 100 at "off," switch 110 in line 111 is closed. Setting cross feed selector switch 96 to "feed" closes switches 112 and 113 in lines 114 and 115 respectively, supplying power to solenoid 116 or 117, according to the position of selector switch 97, closing switch 118 or 119. Solenoids 116 and 117 position the valve for the saddle hydraulic feed motor 18 (FIG. 1). Also, switches 130 and 132 are closed in line 131, switch 134 is closed to by-pass open contacts 136 in line 135, solenoid 133 on the feed valve for the saddle feed motor being now energized to provide cross-feed in the direction chosen at selector switch 97, at speed established on potentiometer 104.

If auto long feed selector switch 103 is at "off," switch 137 in line 138 and switch 139 in line 140 are closed. The positioning of selector switch 101 to "right" closes switch 141 in line 138 which is tapped into line 142 to jump open switches and energize the long feed right solenoid 85. Turning switch 101 to "left" opens switch 141, but closes 143 in line 140, energizing the long feed left solenoid 86. Appropriate manipulation as described provides power long feed under manual control.

If now the controls are to be readied for tracer controlled operation, switch 100 is turned to "on," dropping out the switches 110 and 130 in the manual cross-feed control circuits and closing switch 144 in the auto long feed control circuit. Now turning manual long feed selector 101 to "off" drops out switches 141 and 143, and throws reversing switch 145 on line 142, determination of table feed direction being now under control of limit switches set at the ends of traverse, operating a switch cam to throw from solenoid 85 to 86 and vice versa. Switch 145 may also be manually operated from manual selector switch 101. Switching selector 103 to "on" drops out switches 137 and 139 in the manual feed control lines 138 and 140 respectively, while closing switch 142a in the auto long feed control line 142, completing the circuit through switches 144 and 145.

Relay CR2 in line 120 closes contactor 122 in line 123 serving the cross-feed out solenoid 116 and, through line 124 tapped from 123, to solenoid 117. Contacts 146 in line 123 are closed by relay TR1 in line 135, contacts 136 in 135 being closed by relay CR3 to energize TR1 and TR2, the latter closing contacts 147 to energize solenoid 148 of the incremental cross-feed servo. The pick feed cylinder responds to actuation of limit switch 127 in line 120, contacts 121 being closed by CR2. Selector 96 is set to "pick," dropping out all the manual control circuit switches. The cross-feed is now responsive to actuation by the table limit switches and switch 127, for incremental feed in the direction established by selector 97, now through "in" switch 149 or "out" switch 150 on line 151, contacts 152 being closed by relay CR3 on line 154 which also opens contacts 155 to the rectifier 156 in the long feed servo control circuit, energizing relay SR1 to bring in contactors 157 or 158 on lines 142 and 142b, readying the long feed reversal system. Such table reversal and incremental cross-feed arrangements are well known in the automatic milling machine art, hence require no further description here.

Figure 6:
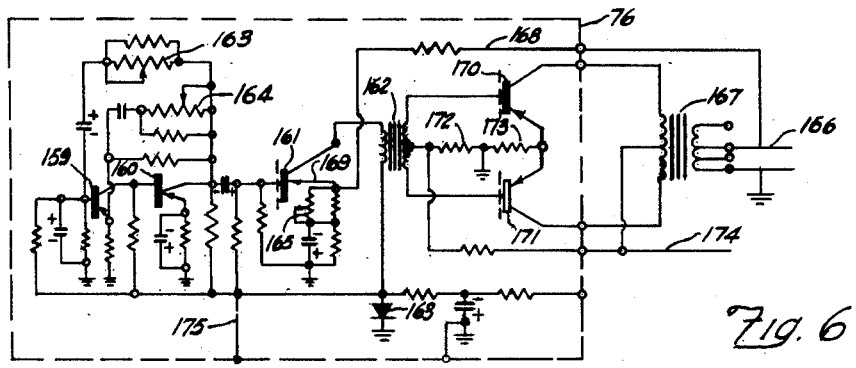
FIG. 6 is a schematic diagram of the high frequency power supply section of the electrical control system.
Figure 7:
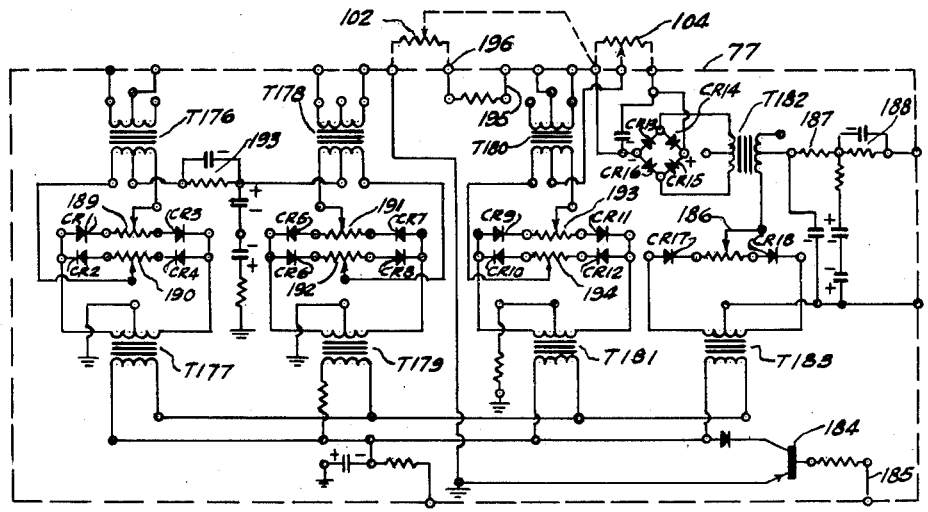
FIG. 7 is a schematic diagram of the trans-axis module of the electrical control system.
Figure 8:
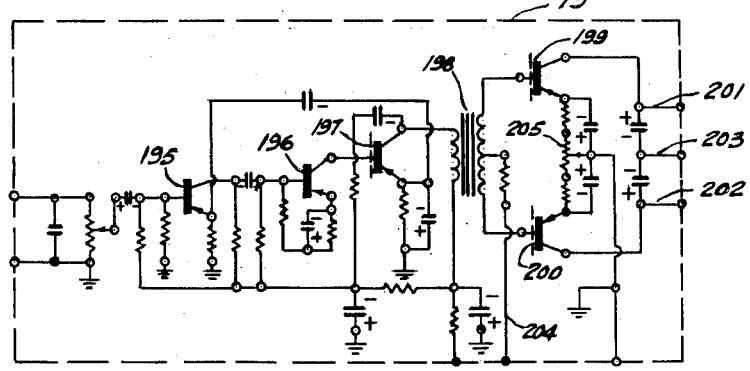
FIG. 8 is a schematic diagram of one of the servo amplifiers.

With the control system established at trace "on" condition as above described, the feed servo system of FIG. 3 is disposed for response to the tracer head error signal manipulated by oscillator 76, trans-axis module 77 and amplifiers 78, 79, the details of which are shown in FIGS. 6, 7 and 8 respectively. Oscillator 76 is of the negative feed back type, with components preferably selected and tuned for resonance at 1 kc. frequency. A low-voltage 60-cycle A.C. is brought from the secondary of transformer 109 (FIG. 5) and fed to a 3-stage oscillator consisting of transistors 159, 160 and 161 coupled to the primary of transformer 162, grounded through rectifier 163. The collector of 160 is fed back to the input of 159 through a potentiometer 163. Resonance at desired frequency is established by feeding collector of 160 back to the emitter at 159 through potentiometer 164. Amplitude regulation is achieved by the setting of potentiometer 165. Center tap 166 on the secondary of transformer 167 supplies the 1 kc A.C. power to the tracer head and amplifiers, thus assuring a stable reference condition, regardless of fluctuation in voltage of the 60-cycle supply. The stabilized output of 160 is collected by 161 and passed to primary of transformer 162, whose secondary terminals are coupled in a push-pull stage with matched transistors 170 and 171, center-tapped to the secondary through resistances 172 and 173. The collectors of 170 and 171 are coupled to the primary terminals of transformer 167, which is centertap coupled to the secondary of 162. This arrangement provides a balanced wave. Line 175 supplies the long feed potentiometer 102 connected into the trans-axis module 77, for purpose later to be shown.

The trans-axis module 77 is in effect the message-center of the tracer, details being shown in FIG. 7. It comprises a group of rectifier bridges under the influence of the tracer circuit excitation, the tracer transformer output or error signal and the amplifiers 78, 79, impressed through the several transformers. The primaries of transformers T176 and T178 are in parallel with the tracer output, the vertical amplifier input and the armature of vertical feeds servomotor 81 (FIG. 3). The primaries of transformers T177, T179, T181 and T183 are in parallel on the collector of transistor 184 whose base is connected at 185 to the tracer excitation from output 166 of oscillator 76 (FIG. 6), amplitude regulation being provided by feedback with the amplifier outputs to line 168. The primary of T182 is connected at one terminal to the wiper of a potentiometer 186 and at its center tap, through resistors 187 and 188, to the output of vertical amplifier 79 and to valve motor 81. Potentiometer 186 is coupled to the secondary of T183 between rectifier CR17 and CR18. The primary of T180 is connected to the input of long amplifier 78.

The secondary of T176 is coupled to the wipers of potentiometers 189 and 190 in the bridge CR1, 2, 3, 4, the bridge being coupled to the secondary of T177. A similar arrangement is made with the secondaries of T178 and T179, involving potentiometers 191, 192 and rectifiers CR5, 6, 7, 8. Center taps of T176 and T178 are coupled through resistor 193. Another similar bridge with potentiometers 193, 194 and rectifiers CR9, 10, 11, 12 is associated with the secondaries of T180 and T181, except that the center tap from T180 is coupled to the wiper of slow down potentiometer 104, whose coil is in series with the wiper of long feed potentiometer 102, the coil of which is on line 175 from the oscillator 76, and at terminal 196 is connected to the armature of long servomotor 80. The coil of slow down potentiometer 104 is coupled to a rectifier bridge CR13, 14, 15, 16, which is cross-coupled to the secondary of T182. The secondary of T183 is center tapped to the output of vertical amplifier 79 and to the vertical servomotor 81.

The vertical amplifier 79 is diagrammed in FIG. 8. It will be understood that long amplifier 78 is similar, except that it provides amplification on the long feed servo actuation. The amplifier 79 is of conventional design, including 3 series stages through transistors 195, 196 and 197 to transformer 198 whose secondary is in a push-pull system with matched transistors 199 and 200, the output being impressed through lines 201 and 202 on the valve signal voltage at the transformers of trans-axis module 76. The input is taken from the terminals of T178 in the trans-axis module at the oscillator output level. B— line 203 is connected to the servomotor winding. Line 204 center-tapped from the secondary of transformer 198 connects with reference from the oscillator to the amplitude regulation line 168 in oscillator 76. The wiper of balancing potentiometer 205 is grounded in common with ground lines of the trans-axis module, horizontal amplifier and the 60-cycle supply to the oscillator.

*Operation*

Referring again to FIGS. 1-4, the machine is readied by aligning workpiece 30 and pattern 28 on table 16, using suitable reference points and checking with the usual gauges, indicators or scopes. The selected cutter 32 is chucked in the spindle and checked for runout. Power is now turned on, lighting "power on" light 89 and making power available to the control system and amplifier, but at this stage all other selector switches and the potentiometers should be at "off." The pump, trace selector and auto long feed switches 95, 100 and 103 are turned on and long feed potentiometer 102 turned to maximum, cycling the table back and forth between table limit switches, which are set to the maximum traverse of the pattern 28. The pattern is so constructed that at no traverse between these limits will the tracer stylus leave the pattern. By pressing button 106 the operator can read on meter 105 the maximum long feed rate, after which potentiometer 102 may be adjusted to produce the normal long feed rate best suited to the cut. A trial stylus 47 is chucked in the tracer head and by manipulation of the cross slides 24, 25 and the manual vertical feed crank 20 the stylus is brought into contact with the master at null or reference position. Trial traverses are made to determine the maximum stylus deviation as read on the meter 105. A working stylus 47 is then selected which is sufficiently larger than the cutter diameter to compensate for the maximum stylus deflection and cutter runout, so that at no time will the cutter advance on the work beyond the corresponding position of the stylus on the pattern. A difference on the order of .015 to .020" is usually found satisfactory, but for very fine finishing, this difference may be reduced by using a lower long feed rate.

After setting the incremental cross-feed to a suitable pick, according to finish desired, with selector 96 at "pick," coolant selector 93 as desired, cutter and stylus at their starting reference points in contact with work and master respectively and cross-feed selector switch 97 at desired direction, the machine is ready for automatic tracing. The starting point is preferably at the lowest knee elevation required in the trace, to insure that knee travel is within its limits.

At null or reference position of stylus 47, the core 61 is at null or minimum signal position, indicated on meter 105 by a zero or minimum reading. The physical position of winding 60 may be adjusted by screw 71 to set this null with reference to the range of vertical stylus movement relative to the head barrel 40. With stylus 47 contacting master at null, no error signal is produced, under which condition the table 16 will feed at the rate established by potentiometer 102 and the knee will be stationary. This condition prevails under the electrical balance existing with the excitation current flow in the trans-axis module 77, such balance being achieved through the prior adjustment of the potentiometers in the rectifier bridges.

The servomotors 80, 81 are of the type usually referred to as torque motors or rotary solenoids. The motors 80 and 81 are linked to the spools of respective servo valves 82 and 87 in such manner that at zero or minimum electric torque the valve spool balances with the rotor at a preselected position, but if the motor energization is increased, with corresponding torque increase, the motor moves the spool an amount proportionate to the increased torque, balancing in the new position. If now the motor is deenergized, back-torque from the valve returns the spool toward the null balanced position. In my arrangement the null system balance of motor 80 with valve 82 is at maximum opening, that is, to establish maximum feed rate through directional valve 83 to the hydraulic motor 84, which drives the table 16. If now potentiometer 102 is adjusted to increase flow through itself and slow down potentiometer 104 to the armature of motor 80, the latter moves the valve spool, proportionate to the increase in motor torque, to a new balance at reduced feed, amplification and rectification being accomplished through the trans-axis module 76 in the rectifier bridge associated with T180 (FIG. 7), tapped to the wiper of potentiometer 104. Similarly, of an error signal appears in module 76 at T182, it is there amplified, rectified and passed through the associated bridge to the coil of potentiometer 104 and hence to the long servomotor armature, in addition to any signal through potentiometer 102, whereby further to increase motor torque and move the valve spool to a still lower feed rate position. Thus, any deviation of stylus 47 from null causes the table feed to reduce in proportion to the amount of deviation.

Motor 81, valve 87 and associated controls are similarly related, but with the important exception that the null balance is achieved at a position such that the pressure in cylinder 17 established by valve 87 on the head side of piston 17a exactly balances the downward hydraulic thrust and weight of the knee imposed on the rod side. Thus, at null position of stylus 47, the knee is stationary. A reversal on the winding circuit of motor 81, actuated by change in polarity as the core 61 passes through null position provides reversal of motor 81 and consequent reversal of the direction in which the knee feeds in response to the error signal, amplified and rectified in trans-axis module 77, and delivered through the bridges associated with T182 and T183. As previously noted, T182 is also on the bridge delivering error signals to the long feed servo, hence both vertical and long feeds are modified by the same error signal in like proportion, but due to the arrangement described, the rate changes are inverse, the long feed reducing as the vertical feed increases.

Referring to FIG. 2, as stylus 47 traverses a horizontal pattern surface such as A, the core 61 is held at null, it being understood that any tendency to deflect by drag has been compensated in the adjustment of pressure exerted through spring 69, or appropriate adjustment of the null relationship by screw 71, as heretofore described. Assuming table feed to right, when stylus 47 reaches fillet B, it will deflect, causing the knee to feed down and the table feed to slow, in proportion to the stylus deviation, in turn proportionate to the degree of change in the pattern contour level. As previously indicated, the torque motors 80 and 81 are actuated at the 1000 cycle frequency of the output from oscillator 76, which pulse also appears in the error signal. There is then little inertial effect to cause lag in response of the motors, which furthermore are of a type moved and braked at low torque, responding accurately to small signal increments.

If the stylus reaches a sharply rising or vertical wall, the stylus deflection will increase until the table is brought to a stop and the vertical feed achieves its maximum. As previously described, the stylus size is chosen to allow for such extreme deflection without the cutter overrunning the stylus and possibly damaging the work. However, for finest finish, and particularly to prevent stylus from excess deflection or completely leaving the pattern at sudden changes such as represented by the intersect of B and C, the slow down potentiometer 104 is used for more rapid deceleration or complete stoppage of the table feed. After passage of the critical contour, the slow down is restored to "off" and trace resumes at normal feed. On a downward slope such as D, the stylus tends to drop. In such case the core 61 passes below null, which occasions the reversal of electrical torque on motor 81, as above described, but the opposite displacement of the core from null produces proportionately the same error signal as by displacement to the other side of null. However, the knee will now feed up as the table feed slows, being the action again tending to restore null conditions.

When the stylus reaches the end of the traverse, as at E, limit switch LS2 (FIG. 3) is tripped to close the circuit to cross-feed the saddle and reverse the table feed, whereafter the trace is resumed in opposite direction.

At the 1000 cycle frequency, and due to the well-balanced circuits and minimum mechanical motions, I require no phase matching, anti-hunt mechanisms, superimposed dither, resolvers or other complex and capricious devices heretofore resorted to in a vain effort to achieve high sensitivity and accuracy. The response of my tracer is such that when tracing contours like the fillet B, even at relatively rapid feeds, there is substantial synchronization between the two feeds, for uniform traverse of the contour, rather than the stepping motions and hunting characteristic of prior tracers.

For the sake of clarity and brevity, I have not undertaken to describe various auxiliary features which are not required for the successful practice of my invention, but may in some cases be desirable. By way of example, the vertical feed cylinder 17, FIG. 4, may be connected, as by line Vc, to the cross-feed hydraulic system, through suitable servos, whereby the knee may be power feed under control of the manually directed cross-feed system. This type of arrangement may be convenient for more universal use of the milling machine, apart from operation with my tracer apparatus.

Although I have chosen a particular embodiment to illustrate my invention, such example is not to be considered restrictive, as changes and modifications may be made without departing from the spirit and scope of the appended claims.

I claim and desire to secure by Letters Patent the following:

1. Contouring apparatus for a machine tool, adapted to hold a cutter, a pattern and a workpiece, comprising: means for fixing said pattern relative to said workpiece; a tracer head fixed relative to said cutter; a linearly variable differential transformer in said head, including a single linearly displaceable core effective to vary transformer output in proportion to core displacement; a deflectable stylus carried by said head in position to trace said pattern; means associated with said stylus for displacing said core in proportion to deflection of said stylus in any direction relative to said head, the core displacement constituting the sole means responsive to stylus displacement whereby to vary output of said transformer a first slide, a second slide transverse to said first slide, first and second feed means actuating said first and second slides respectively to establish rectilinear motions of said pattern relative to said stylus; first and second feed control means for said first and second feed means respectively; an electrical energy source connected to said transformer and said feed control means; means for establishing a preselected null condition with said stylus contacting said pattern, in which condition said first slide is at rest and said second slide is in motion at a preselected maximum feed rate; and additional control means responsive to the output of said transformer effective to set said first slide in motion and simultaneously reduce the feed rate of said second slide, the effect on said second slide being a function solely of the output amplitude.

2. Contouring apparatus according to claim 1, in which said first feed means is a double-acting hydraulic cylinder and said first feed control means is a servo valve positioned by a torque motor.

3. Contouring apparatus according to claim 1, in which said second feed means is a hydraulic motor, and said second feed control means is a servo valve driven by a torque motor.

4. Contouring apparatus according to claim 1, in which said first feed means is a double-acting hydraulic cylinder; said first feed control means is a first servo valve driven by a first torque motor; said second feed means is a reversible hydraulic motor; said second feed control means comprises a second servo valve effective to vary feed rate in either direction of said second torque motor; the arrangement being such that at said preselected null condition said torque motors are stabilized at preselected positions of said first and said second servo valves, and circuit control means responsive to change in the output of said transformer causes said torque motors to reposition said servo valves in proportion to said change.

5. A control system for an electro-hydraulic tracer apparatus, comprising: a high frequency alternating current source, a linearly variable differential transformer excited by said source; a single linearly displaceable core in said transformer; an output winding for said transformer emitting a total error signal of amplitude proportionate to displacement of said core in either direction relative to said winding; two control circuits, each responsive to said total error signal; separate rectifying circuits in each of said control circuits, a separate amplifying circuit for each of said control circuits; interlocking circuits for said two control circuits maintaining the amplitude of energization in each of said control circuits proportionate to the amplitude of said total error signal; a separate direct current torque motor in each of said control circuits; and a separate servo valve for each of two machine feeds, associated in preselected balanced torque relation with each of said torque motors, whereby changes in feed rates of said machine feeds are simultaneously effected in magnitude proportionate to the said amplitude of said total error signal, one only of said feeds being responsive to phase reversal of said error signal.

6. A control system according to claim 5, wherein at least one of said feed rates is additionally controllable by a manually variable signal independently of said error signal.

7. A control system according to claim 5, wherein at least one of said feed rates is controlled by the amplitude resultant of the error signal and a manually variable signal independent of said error signal.

References Cited in the file of this patent

UNITED STATES PATENTS

| 2,395,525 | Wilkie et al. | Feb. 26, 1946 |
| 2,559,575 | Fryklund et al. | July 3, 1951 |
| 2,735,342 | Glaser | Feb. 21, 1956 |
| 2,939,287 | Capron et al. | June 7, 1960 |